United States Patent Office 3,286,343
Patented Nov. 22, 1966

3,286,343
METHOD OF PREPARATION OF A COMPOSITE GUIDE TUBE FOR NUCLEAR REACTOR, AND DEVICES FOR THE PRACTICAL APPLICATION OF SAME
Lucien Alfille, Orsay, André Barriere, Paris, Guy Farges, Antony, Georges Rodier, Levallois, and Michel Rozenholc, Montrouge, France, assignor to Commissariat a l'Energie Atomique, Paris, France
Filed Jan. 23, 1963, Ser. No. 253,348
Claims priority, application France, Jan. 31, 1962, 886,559
4 Claims. (Cl. 29—528)

The present invention relates to nuclear reactors of the cool pressure tube type, for example in which the pressure tubes are surrounded by heavy water.

The invention is more especially concerned among reactors of this type with those in which the stream of coolant is separated physically in the cool pressure tube by means of a guide tube, the functions of which are to carry the weight and to effect the guiding of the fuel during operations of charging and discharging the fuel, to provide a support on the outer surface thereof for the system of heat insulation which permits the pressure tube to remain cold, for example in contact with heavy water, and to limit heat losses from the coolant to the heavy water, it being understood that the said guide tube must withstand the corrosive action of the coolant at operating temperatures.

The invention is even more especially concerned with guide tubes of composite design in which there is especially provided as a heat insulation a refractory powder such as magnesium oxide, zirconium oxide, beryllium oxide, aluminum oxide, etc., and also magnesium carbonate if $CO_2$ is employed as coolant, the said powder being, in design solutions of the prior art, placed and compressed in the space formed between the pressure tube and an inner tube or liner.

The chief object of the invention is to make the said composite guide tubes such that they meet the various practical requirements more effectively than has hitherto been achieved, and especially that they withstand thermal cycles under both axial and longitudinal temperature gradients without incurring any danger of continuous and destructive processes.

The invention mainly consists in a method of preparation of a composite guide tube in which a heat-insulating refractory powder is placed on a rigid inner tube, the said powder being then surrounded by a flexible envelope tube and then compressed to a pre-determined value, whereupon the composite guide tube assembly is subjected to at least one cycle of internal heating at a temperature which is higher than the operating temperature of the reactor and external cooling especially by means of a circulation of water, the said cycle thus producing diametral and axial deformations which introduce a clearance between the said powder and the said inner tube, the extremities of the said guide tube being then shaped especially by cutting-off and facing on the lathe.

The invention also consists in an alternative form of the method referred to above, in which the said powder is projected onto the said inner tube by any suitable means, especially by means of a spray-gun, the said powder being mixed with a binding agent which can be camphor in a solution of acetone, the said powder being subsequently covered by a spiral wrapping consisting of at least one layer of wire gauze tape, the complete unit is then placed in a drying oven in a fore-vacuum at a temperature ranging between 60 and 150° C. at which the camphor is sublimed, the unit thus obtained being fitted inside the said flexible envelope tube, a narrowing operation being then performed which has the effect of firmly applying the envelope tube against the said powder while compressing this latter, and the assembly thus obtained is subjected to at least one cycle of internal heating and external cooling.

The invention further consists in a method of assembly of two composite guide tube elements prepared according to at least one of the above methods, in which, the said elements being each provided with a refractory powder between the pressure tube and a rigid inner tube, the said powder being caused to adhere to the outer face of the said rigid tube then compressed and held in place by a thin envelope tube which is fitted with a certain clearance inside the said pressure tube, the extremity of one element to be assembled is provided on its inner tube with a male screw-thread having a fine pitch whilst the extremity of the other element is provided with a female screw-thread of identical pitch, the outer envelope tubes of the two elements being faced in such manner that, when the threaded portions are screwed home, they are brought flush to within a few tenths of a millimeter, the said envelope tubes being provided at the level of the joint with a portion of slightly reduced thickness inside which is wound a thin metallic band which is either welded or crimped onto itself.

The invention finally consists in a method of joining to a non-nuclear extension tube a composite guide tube which is prepared and assembled in accordance with any one of the above-mentioned arrangements, in which, the inner tube being coupled by screwing to the extension tube, the compressed powder is removed on the lathe over a certain length of the extremity of the guide tube and replaced by a steel ring, a connecting sleeve is slidably mounted on the extension tube and is designed to be applied as a scarf type joint against the steel ring between the inner tube and the envelope tube, provision being made for three metallic bands which are wound round and either welded or crimped onto themselves, the first metallic band having a chamfered edge and fitted in a channel formed in the external surface of the envelope tube in the vicinity of the extremity thereof, the second band being seam-welded on the extension tube and on one extremity of the connecting sleeve, and the third band being seam-welded on the first band and on the other extremity of the connecting sleeve.

The methods of assembly which have been described in the two previous paragraphs make it possible to compensate differences in expansion while at the same time maintaining the powder in position.

And the invention will in any case be made more readily apparent from the complementary description which follows below and the accompanying drawings, the said complementary description and drawings being given primarily by way of example and not in any sense by way of limitation.

There have been illustrated in the drawings only those elements which are necessary in order to acquire an understanding of the invention, while the corresponding elements of these different figures have been given identical reference numerals.

Figure 1:
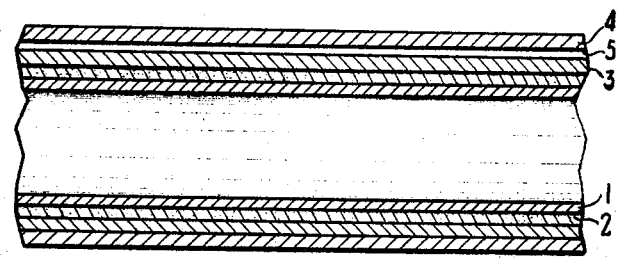
FIG. 1 is a view in longitudinal cross-section of a composite guide tube in accordance with the invention placed inside its pressure tube.

The inner tube 1 which is illustrated in FIG. 1 is rigid and has a thickness of the order of 1 to 3 mm., and is constructed, for example, of magnesium or sintered aluminum. The powder 2 is caused to adhere to the external surface of the said tube by various methods which will be described below, and is then compressed to a pre-determined value and held in position by means of an envelope tube 3 of magnesium containing 0.6% zirconium, for example, the apparent thermal conductivity of the compressed powder increasing with its real density. The combined assembly is fitted inside the pressure tube 4 with a certain clearance 5 (for example of the order of 1 mm.) and constitutes the composite guide tube. The assembly is in contact with the coolant under pressure, $CO_2$ for example, which circulates in the interior of the tube 1, soaks the pores of the powder 2 and filters through the extremities inside the clearance 5. The pressure tube 4 is surrounded by moderator such as heavy water, for example.

The powder which is compacted by vibrations (to a low density) has no technological strength whereas it is an excellent heat insulating material. On the other hand, when the powder is compressed, it has satisfactory crushing strength, for example, but its insulating properties are less effective and call for a more substantial thickness in order to limit heat losses to the heavy water moderator. The choice of compactness of the powder results from a compromise between thermal and technological performances. A simple method which consists in extruding directly an assembly of three constituents such as, for example, a guide tube of sintered magnesium–powdered magnesium oxide–liner or sheath of magnesium alloy containing 0.6% zirconium is very difficult to carry into effect since the rheological performances of the constitutent materials differ too widely.

Another method consists in making use of an inner tube finished to size which is placed inside an envelope tube of magnesium with a 0.6% zirconium content having a diameter such that the annular space between the inner tube and the envelope tube can be filled with powder by vibration, following which the envelope tube can be narrowed by means of a drawing operation to an effective diameter resulting in an annular layer of powder which is compressed to the desired value. The combined unit has a very satisfactory mechanical strength and sufficient heat insulating properties. A few difficulties arise in the said narrowing operation as regards the centering of the layer of powder. It is necessary to ensure that the layer of non-compressed powder is perfectly uniform and evenly distributed. The vibration-filling operation is then carried out by means of centering spiders which are moved upwards progressively as the vibrational compacting operation takes place.

Another technique which permits of perfect centering of the layer of powder consists in projecting this latter onto the inner tube by means of a spray-gun, the powder being mixed with a binding agent such as camphor in a solution of acetone. The unit is then trued to accurate dimensions and placed in a drying oven in a fore-vacuum at a temperature of the order of 60 to 150° C. The camphor is sublimed and the tube which bears the powder is fitted inside the envelope tube. The narrowing operation is then carried out as stated above. After narrowing, the compressed layer is perfectly centered.

An alternative form of this process consists, after deposition by means of a spray-gun, in covering the unit which is trued to accurate dimensions with a spiral wrapping consisting of at least one layer of wire gauze tape (magnesium, for example) or of silica fabric tape, and then in placing the complete assembly in the vacuum oven.

Composite tubes of this type which are prepared in the above manner can serve as heat-insulating guide tubes.

It is preferable, however, to subject the guide tubes to a heat treatment which is carried out before these latter are put into service. In fact, if consideration is given to the different mechanical and thermal stresses to which the said tubes are subjected during their functions in the reactor, it will be seen that, in the course of the thermal cycling operations, the rigid inner tube expands to an extent of several centimeters over a length of 5 meters.

The envelope tube which is in partial contact with the cool pressure tube is elongated as a result of plastic deformation as induced by the compressed powder and, at the time of cooling, this casing is elongated with respect to the inner tube and draws powder to the ends. On completion of a few thermal cycles under a radial thermal gradient, the powder is supercompressed by the expanded inner tube and, as the cooling process takes place, a few circular cracks appear and a slight separation of the outer wall takes place. This separation permits relative sliding of the two metallic tubes without any drawing of one tube by the other. It is then merely necessary to true the outer end-faces in order that they may be joined to the non-nuclear extensions. The guide tube is ready for use as a composite structural element in pressure tube reactors.

Accordingly, let us examine the behaviour of this composite tube under a temperature gradient.

Let it be assumed that the inner tube is of sintered magnesium, that the internal diameter of this latter is, for example, of the order of 100 millimeters and that the thickness thereof is 3 millimeters, that provision is made for a magnesium oxide layer which is compressed to approximately 30 to 50% of theoretic density and having a thickness of the order of 2.5 mm., the combined assembly being encased in a tube of magnesium-zirconium alloy containing 0.6% zirconium having a thickness of 0.5 to 1 mm., for example.

The interior of the tube is brought to a temperature of the order of 500° C., the temperature adopted being slightly higher than the operating temperature, whereas the envelope tube is brought to 50 or 60° C. by water-cooling, for example.

Under these conditions, the diameter of the inner tube has expanded by approximately 1 millimeter, whereas the cool envelope tube has necessarily been deformed plastically and, accordingly, on completion of one or two thermal cycles of the guide tube temperature, there is made available a very small clearance resulting from the combination, on the one hand of the supplementary compression of the powder, and on the other hand of the plastic deformation of the envelope tube.

In the axial direction, similar processes occur: the inner tube which is heated under the same conditions over a distance of approximately 5 meters expands by approximately 50 mm. This expansion draws with it the powder which in turn draws with it the cool envelope tube of magnesium-zirconium. There then takes place a permanent elongation or set of the envelope tube and, upon cooling, the shrinkage of the inner tube can produce a displacement of the powder out of the guide tube at the extremities thereof.

After a few cycles have taken place, cracks have formed locally along the circumference of the magnesium oxide layer (as shown by radiographic tests), the bonding between powder and inner tube and powder and envelope tube has been weakened by longitudinal shearing stress and diametral separation, thereby creating in particular a radial clearance between the powder and the inner tube.

Under these conditions, it is merely necessary to subject the disturbed extremities of the composite tube to a forming operation (for example by cutting and facing on the lathe) in order to obtain a unit which will be ready to withstand thermal cycles under both longitudinal and axial temperature gradients, vibrations, etc. without incurring any danger of continuous and destructive processes.

Figure 2:
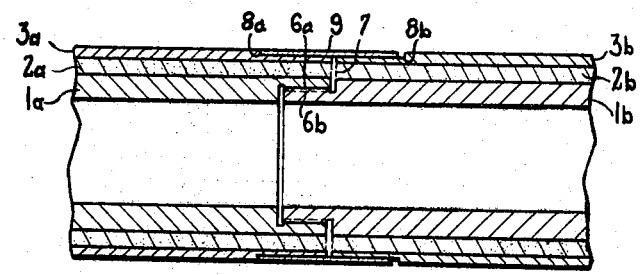
FIG. 2 is a view in longitudinal cross-section of a mode of assembly in accordance with the invention, of two elements of a composite guide tube.

As can be seen in FIG. 2, when it is found necessary for reasons of useful length to join together the elements $a$ and $b$ of the composite guide tubes in accordance with the invention, one of the extremities of one element to be assembled is provided in the inner tube portion $1a$ thereof with a female or internal screw-thread $6a$, which can be either straight or tapering with a fine pitch for example of 0.25 to 0.5 mm., over a distance of 15 to 20 mm., while the other extremity has an identical but external screw-thread 6b. The envelope tubes 3a and 3b are faced in such manner that, when the screw-threads of the inner tube are screwed home, they are brough flush to within a few tenths of a millimeter at 7.

At the level of the joint, the envelope tubes have portions of slightly reduced thickness 8a and 8b, the reduction in thickness thereof being of the order of 0.1 to 0.2 mm., inside which there can be wound a thin band or ribbon 9 of zirconium (0.02 to 0.05 mm.) or of stainless steel (0.01 mm.) which is tightly applied against the interrupted portion of the envelope tubes and either spot-welded or crimped onto itself in such manner as to form a sleeve which prevents the powder from escaping through the annular opening 7 of a few tenths of a millimeter. In the relative movements which take place, the said sleeve is capable of carrying out movements of a few millimeters.

Figure 3:
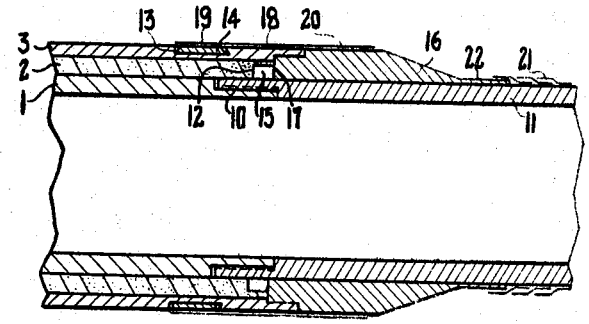
FIG. 3 is a view in longitudinal cross-section of a mode of assembly in accordance with the invention in which a composite tube is joined to a non-nuclear extension tube.

As can be seen in FIG. 3, when it is desired to join a guide tube in accordance with the invention to a non-nuclear extension, a threaded connection 10 is provided for the purpose of joining the inner tube 1 to the extension tube 11 of stainless steel.

The compressed powdered magnesium oxide 2 of the composite guide tube is removed at 12 over a certain distance by means of a lathe-tool.

The extremity of the envelope tube 3 is machined on the outer surface thereof and is provided with a retaining channel 13 which serves for the purpose of embedding therein a stainless steel sleeve 14 having a thickness of 0.1 mm. with chamfered edge which is either welded or crimped onto itself.

A steel ring 15 is fitted inside the annular housing 12 formed as a result of the removal of powder and serves to retain the powder.

A steel connecting sleeve 16 is mounted on the extension tube 11 of stainless steel and is adapted to fit as a scarf type joint inside the annular space 17 which is formed by the envelope tube of magnesium containing 0.6% zirconium. The said connecting sleeve 16 is adapted to slide over the extension tube 11.

The said sleeve 16 is rigidly secured to the envelope tube 3 by virtue of a sleeve 18 formed of a band of stainless steel having a thickness of 0.05 mm. which is wound around the tube and either welded or crimped onto itself. The said sleeve 18 is seam-welded on the one hand at 19 on the steel sleeve 14 which is embedded in the envelope tube and on the other hand at 20 on the outer surface of the slidably mounted connecting sleeve 16.

The thinned-down extremity of the slidably mounted connecting sleeve 16 is coupled to the extension tube 11 by means of a flexible arrangement made up of a thin spirally wound band 21 of stainless steel, the turns of which overlap by at least one half-pitch. The joining of the band 21 on the one hand to the thinned portion 22 of the slidably mounted connecting sleeve 16 and on the other hand to the extension tube 11 is carried out by seam-welding.

This arrangement accordingly makes it possible for the expansion of the extension tube 11 to take place relatively to the envelope tube 3 of the composite guide tube. The said arrangement is not fluid-tight and the pressure of $CO_2$ is established throughout the powdered insulating material 2 and, subject to the pressure losses involved, accordingly results in equilibrium of static pressures. The arrangement further prevents the powder 2 from escaping from its housing under the thermal stresses (expansions) and vibrational stresses which are liable to occur.

It is necessary to mention the fact that the practical application of the present invention has made it possible to construct in single elements composite tubes having a length of 6 meters, the variation in external diameter over the entire length being of the order of one tenth of a millimeter.

It will be understood that the invention is not limited to the various arrangements which have been described in the foregoing but is intended, on the contrary, to include within its scope all alternative forms.

What we claim is:

1. Method of preparation of a composite guide tube which is designed for nuclear reactors of the cool pressure tube type and through which a coolant circulates, in which a heat-insulating refractory powder is placed on a rigid inner tube, the said powder is surrounded by a flexible envelope tube and then compressed to a predetermined value, the composite guide tube assembly which is thus obtained is subjected to at least one cycle of internal heating at a temperature which is higher than the operating temperature of the reactor and external cooling especially by means of a circulation of water, the said cycle producing diametral and axial deformations which introduce a clearance between the said powder and the said inner tube, the extremities of the said guide tube being then shaped especially by cutting-off and facing on the lathe.

2. Method of preparation of a composite guide tube in accordance with claim 1, in which the said powder is projected onto the said inner tube, the said powder being mixed with a binding agent which can be camphor in a solution of acetone, the said powder is subsequently covered by a spiral wrapping consisting of at least one layer of wire gauze tape, the complete assembly is then placed in a drying oven in a fore-vacuum at a temperature ranging between 60 and 150° C. at which the camphor is sublimed, the unit thus obtained being fitted inside the said flexible envelope tube, a reducing operation is then performed which has the effect of firmly applying the envelope tube against the said powder while compressing this latter, and the unit thus obtained is subjected to at least one cycle of internal heating and external cooling.

3. Mode of assembly with two elements of composite guide tubes in accordance with claim 1, in which the extremity of one element to be assembled is provided on its inner tube with a male screw-thread having a fine pitch whilst the extremity of the other element is provided with a female screw-thread of identical pitch, the outer envelope tubes of the two elements being faced in such manner that, when the threaded portions are screwed home, they are brought flush to within a few tenths of a millimeter, the said envelope tubes being provided at the level of the joint with a portion of slightly reduced thickness inside which is wound a thin metallic band the ends of which are joined together.

4. Mode of assembly in which there is joined to a non-nuclear extension tube a composite guide tube in accordance with claim 3, and in which, the inner tube being coupled by screwing to the extension tube, the compressed powder is removed on the lathe over a certain length of the extremity of the guide tube and replaced by a steel ring, a connecting sleeve is slidably mounted on the extension tube and is designed to be applied as a scarf type joint against the steel ring between the inner tube and the envelope tube, provision being made for three metallic bands which are wound around and the ends joined, the first metallic band having a chamfered edge and fitted in a channel formed in the external surface of the envelope tube in the vicinity of the extremity thereof, the second band being seam-welded on the extension tube and on one extremity of the connecting sleeve, and the third band being seam-welded on the first band and on the other extremity of the said connecting sleeve.

No references cited.

JOHN F. CAMPBELL, *Primary Examiner.*

WHITMORE A. WILTZ, *Examiner.*